(12) United States Patent
Godkin

(10) Patent No.: US 8,363,881 B2
(45) Date of Patent: Jan. 29, 2013

(54) CLOSED-ENDED LINEAR VOICE COIL ACTUATOR WITH IMPROVED FORCE CHARACTERISTIC

(75) Inventor: Mikhail Godkin, San Diego, CA (US)

(73) Assignee: BEI Sensors and Systems Company, Inc., Moorpark, CA (US)

( * ) Notice: Subject to any disclaimer, the term of this patent is extended or adjusted under 35 U.S.C. 154(b) by 2801 days.

(21) Appl. No.: 10/693,394

(22) Filed: Oct. 24, 2003

(65) Prior Publication Data

US 2004/0156526 A1 Aug. 12, 2004

Related U.S. Application Data

(60) Provisional application No. 60/421,929, filed on Oct. 28, 2002.

(51) Int. Cl.
*H04R 25/00* (2006.01)

(52) U.S. Cl. ......... 381/414; 381/400; 381/419; 381/420

(58) Field of Classification Search .................. 381/397, 381/412, 414–415, 420–421, 396; 310/12–14; 335/222
See application file for complete search history.

(56) References Cited

U.S. PATENT DOCUMENTS

| | | | |
|---|---|---|---|
| 3,743,870 A | 7/1973 | Hunt | 310/13 |
| 4,652,779 A | 3/1987 | Wilcox | 310/13 |
| 4,808,955 A * | 2/1989 | Godkin et al. | 335/222 |
| 5,539,262 A | 7/1996 | Strugach | 310/13 |
| 5,731,642 A | 3/1998 | Ogawa | 310/13 |
| 5,808,379 A * | 9/1998 | Zhao | 310/12 |
| 7,499,555 B1 * | 3/2009 | Isvan | 381/71.6 |

FOREIGN PATENT DOCUMENTS

| | | |
|---|---|---|
| EP | 0 397 322 | 11/1990 |
| JP | 59-193700 | 11/1984 |
| JP | 61177897 A * | 8/1986 |
| JP | 11-027920 | 1/1999 |

OTHER PUBLICATIONS

English Translation: JP 61177897A. "Oscillating Device for Pump Speaker or the Like." Feb. 1, 1986. Inventor: Nakamatsu, Yoshiro.*
International Search Report mailed Mar. 16, 2004.

* cited by examiner

*Primary Examiner* — Fan Tsang
*Assistant Examiner* — Phylesha Dabney
(74) *Attorney, Agent, or Firm* — Gilman Clark Hunter & Messina LLC

(57) ABSTRACT

Disclosed is a linear actuator which includes a core, a coil, a magnet assembly, and a housing. The coil that is shaped to be positioned about the core for movement along a longitudinal axis of the core. The housing is supported by core flanges and positioned about the coil and the core. The magnet assembly includes magnets of the same polarity facing the coil and shaped to be positioned inside or outside of the coil, and supported by the core or by the housing, respectively. The core includes first and second portions, each having an end face, and the first and second portions are positioned along the longitudinal axis so that the end faces oppose each other and are separated by a gap. A cavity is formed in each of the end faces along the longitudinal axis.

22 Claims, 12 Drawing Sheets

CLOSED-ENDED LINEAR VOICE COIL ACTUATOR WITH IMPROVED FORCE CHARACTERISTIC

RELATED APPLICATIONS

The present application claims priority under 35 U.S.C. §119(e) from provisional application No. 60/421,929, filed Oct. 28, 2002.

TECHNICAL FIELD

The present invention relates generally to linear voice coil actuators, and in particular to a linear voice coil actuator with improved force characteristics and methods for achieving such improved force characteristics.

BACKGROUND ART

At least three prior art references describe improvements made to linear voice coil actuators by removing some material from one or more parts of the magnetic circuit. U.S. Pat. No. 5,808,379, issued to Zhao and assigned to Kulicke and Soffa Industries, Inc. shows such an improvement: at least one air gap 44 is provided in at least one of the pole pieces. See FIG. 1, herein. (FIG. 1 is a reproduction of FIG. 5 from U.S. Pat. No. 5,808,379, but in which reference numbers have been removed to avoid confusion with reference numbers appearing in FIG. 2 of the subject application.) The stated improvement is an increase in force for a fixed current level due to reduced armature reaction.

Another prior art actuator is depicted in FIG. 2 and described in U.S. Pat. No. 5,113,099, issued to Wong, et al., and assigned to Maxtor Corporation. (FIG. 2 is a reproduction of FIG. 3 from U.S. Pat. No. 5,113,099.) According to this patent, the core 35 has an opening 37 that improves the rise time of the actuator, while additional openings 36 are made to provide heavy saturation of the core to make its magnetic characteristic approach that of air.

Yet another prior art actuator, depicted in FIG. 3, herein, is described in U.S. Pat. No. 5,677,963. issued to Morcos, et al., and assigned to the assignee of the subject application. According to this patent, a hole 109 is drilled through the core 108 in its center. Because of the hole, the flux created by the permanent magnets is not affected, but the flux created by the current in the coil (armature reaction) is substantially reduced. One of the positive effects of this measure is reduction of the force imbalance for any given position of the coil and two different directions of current in the coil.

All of the above three patents substantially describe rectangular voice coil actuators, although U.S. Pat. No. 5,677,963. mentions that the core could be cylindrical. However, the above mentioned patent describes field plates connected to end plates in a fashion which can be interpreted to mean that only two magnets or two sets of magnets are attached to the parallel plates and only two sides of the coil are involved in creating the force.

Despite improvements in actuator performance achieved by these earlier efforts, there continues to be a need for improvement in force imbalance as a function of the position of the coil and current direction in the coil.

SUMMARY OF THE INVENTION

The present invention addresses the need for an improved force balance characteristic and provides a method for achieving such improvements. In accordance with the present invention a linear actuator comprises a core having a longitudinal axis, a coil shaped for movement along the longitudinal axis of the core, and a magnet structure positioned along the longitudinal axis of the core, wherein the core includes first and second portions, each including an end face and a cavity formed in the end face and having an axis of symmetry along the longitudinal axis of the core, and further wherein the first and second portions are positioned so that the end faces oppose each other and are separated by a gap.

By forming a cavity in each of the first and second portions of the core in a direction along the longitudinal axis of the core, that is in the direction of motion of the coil, it has been found that a substantial improvement in force balance can be achieved. The cavity is preferably of substantially the same shape in each of the core portions. For example, a half-spherical cavity can be used, and when the first and second portions of the core are positioned so their end faces oppose each other to form the gap, the combination of half-spherical cavities form a substantially spherical chamber in the core subdivided by the gap.

Preferably, the cavity is widest at the end face of each portion of the core, and decreases in span in a direction away from the end face. The cavity is preferably curvilinear in cross section along the longitudinal axis.

In accordance with the method of the present invention, a linear actuator is formed by forming a core having a first portion and a second portion positioned along a longitudinal axis, defining an end face in each of the first and second portions, removing material symmetrically along the longitudinal axis of the core to form a cavity in each of the first and second portions; and positioning the first and second portions so that the end faces oppose each other and are separated by a gap, shaping a coil for movement along the longitudinal axis of the core, and positioning a magnet structure along the longitudinal axis of the core.

In accordance with the method of the present invention, the removal of material to form the cavity can be accomplished by forming in the end faces of the first and second portions of the core concentric bores of varying diameters having centers along the longitudinal axis. For example, the cavities can be formed by drilling out regions of material of selected depths and selected diameters which are coaxial with the longitudinal axis, and causing the selected diameters of the drilled out regions to increase in a direction toward the end face.

It is therefore an object of the present invention to provide a linear actuator, and a method for forming the same, which has improved force balance characteristics.

It is another object of the present invention to provide a linear actuator and method, in which a core is formed of a first portion and a second portion each with end faces that oppose one another to form a gap, and having a cavity formed in each end face which cavity extends symmetrically along a longitudinal axis of the core.

It is a further object of the present invention to provide a linear actuator and method therefore in which a core having a longitudinal axis is formed of two sections, each having a face transverse to the longitudinal axis and that opposes the other face to form a gap, and further in which each face has formed in it a curvilinear chamber having a span which decreases with distance from the face.

These and other objectives, features, and advantages of the present invention will be more readily understood upon considering the following detailed description and accompanying drawings.

DETAILED DESCRIPTION OF THE INVENTION

The above referenced U.S. Pat. Nos. 5,808,379, 5,113,099. and 5,677,963. are hereby incorporated herein by reference.

Figure 1:
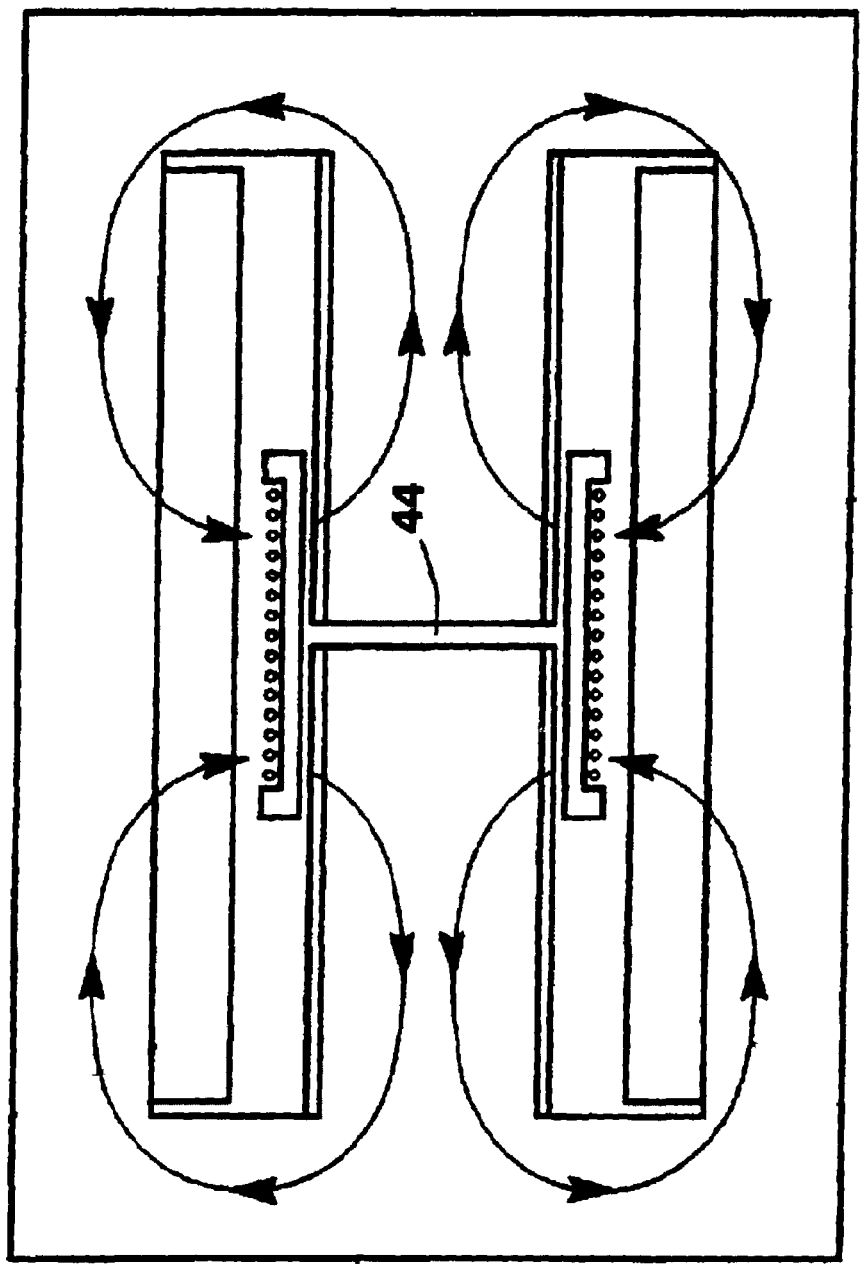
FIG. 1 is a reproduction of FIG. 5 from U.S. Pat. No. 5,808,379, but in which reference numbers have been removed to avoid confusion with reference numbers appearing in FIG. 2 of the subject application.
Figure 2:
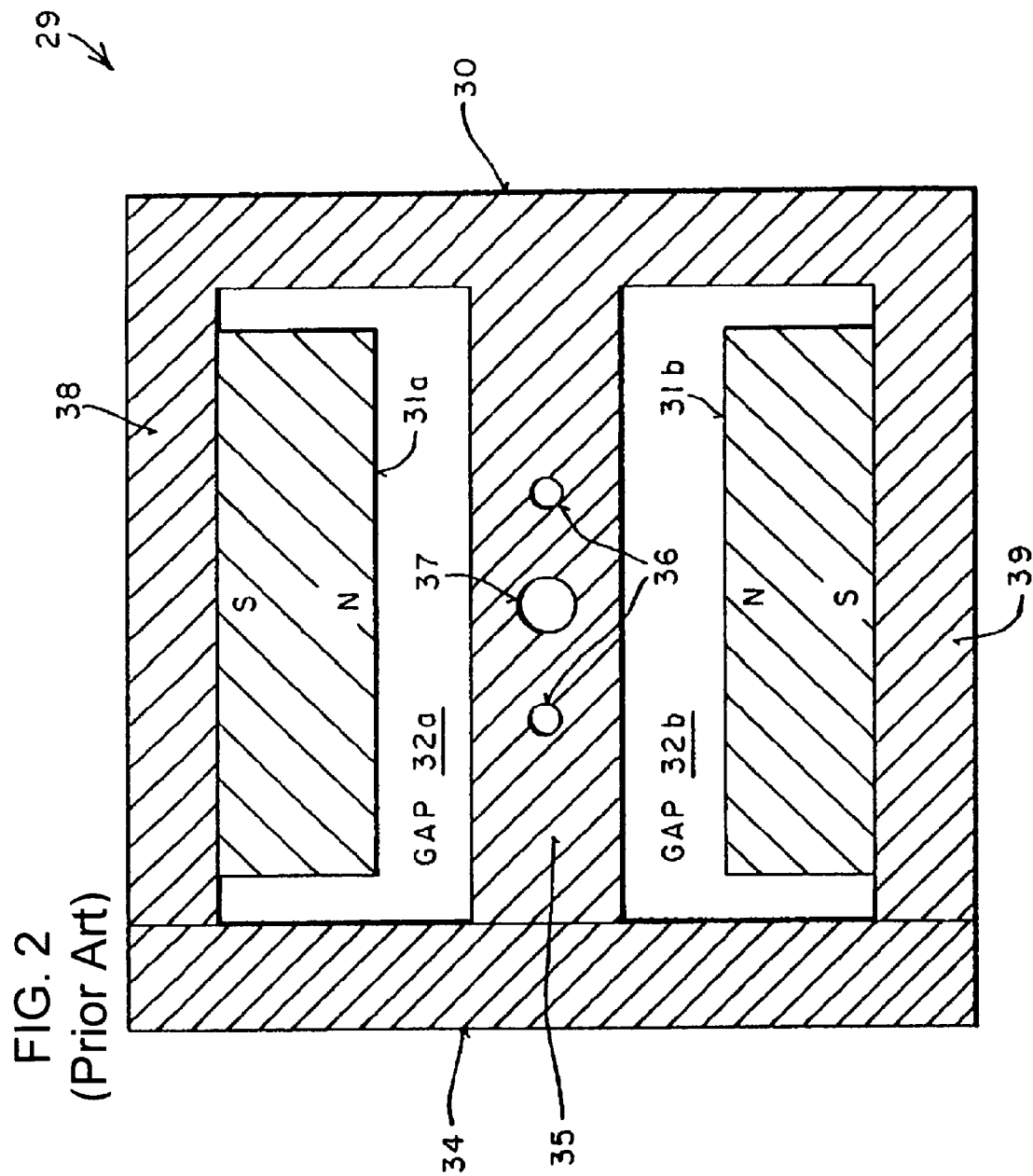
FIG. 2 is a reproduction of FIG. 3 from U.S. Pat. No. 5,113,099.
Figure 3:
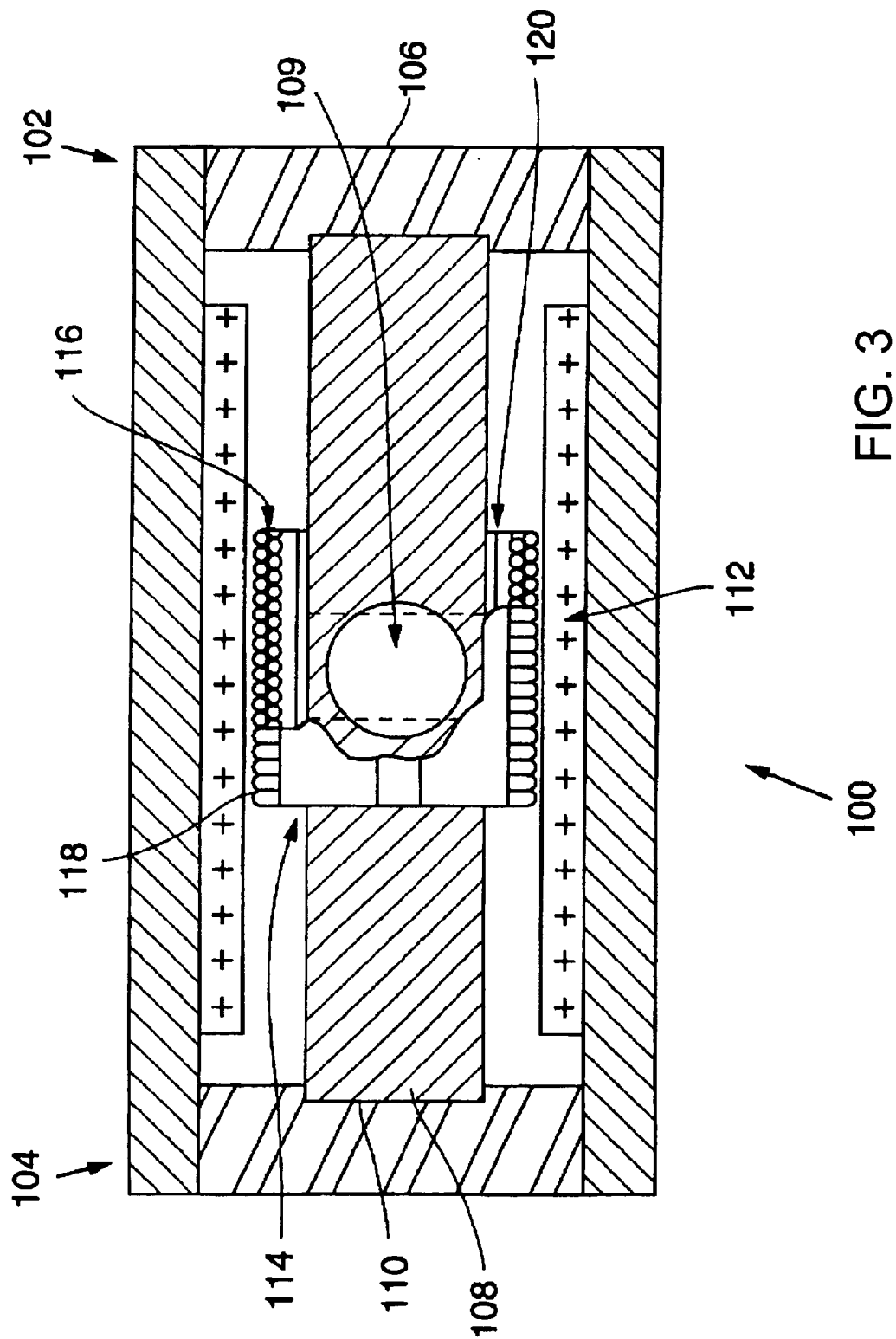
FIG. 3 is a reproduction of FIG. 5 of U.S. Pat. No. 5,677,963.
Figure 4:
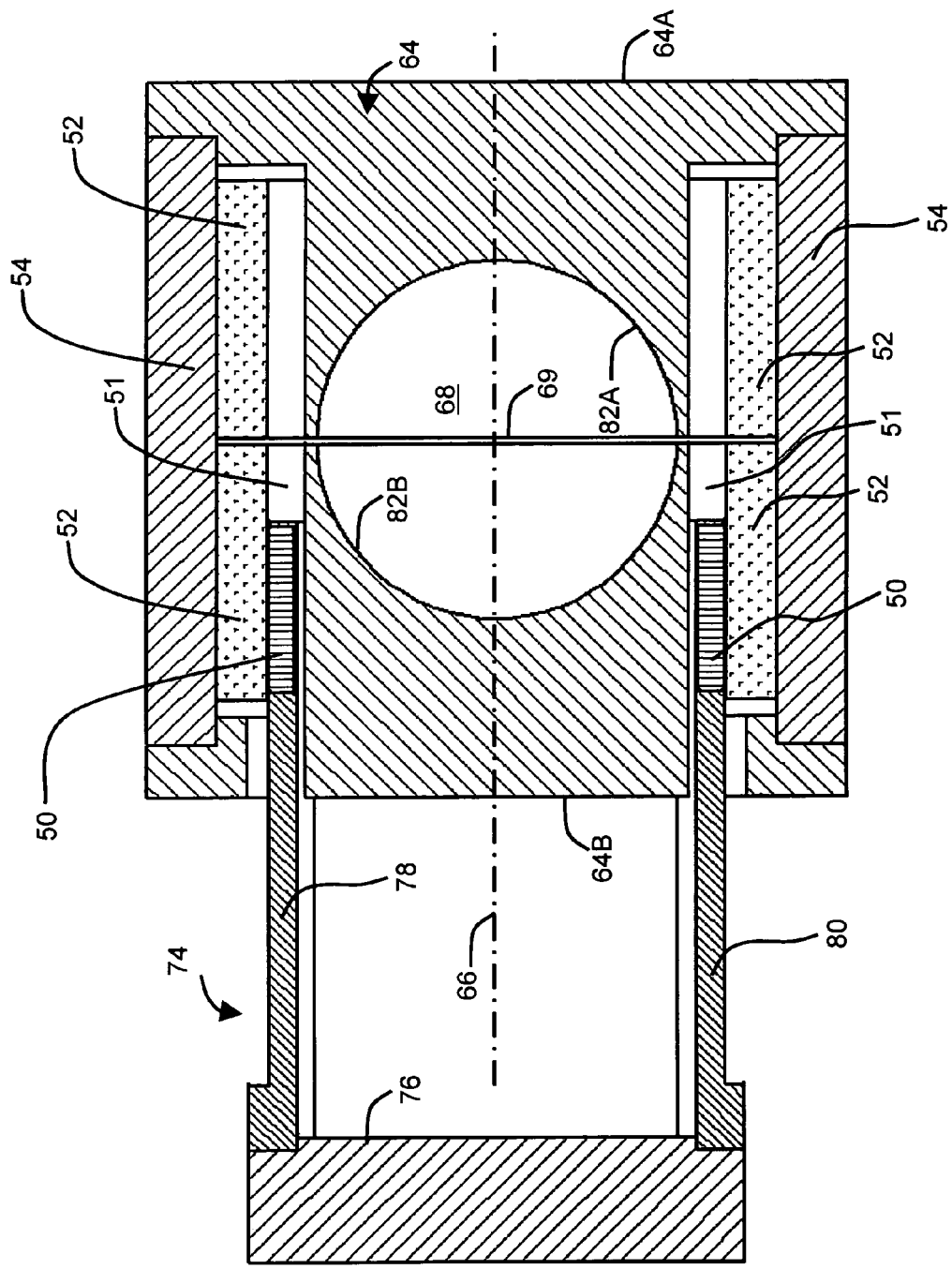
FIG. 4 is a simplified illustration of a cylindrical coil embodiment of the present invention in which magnets are positioned on the outside of the coil.
Figure 5:
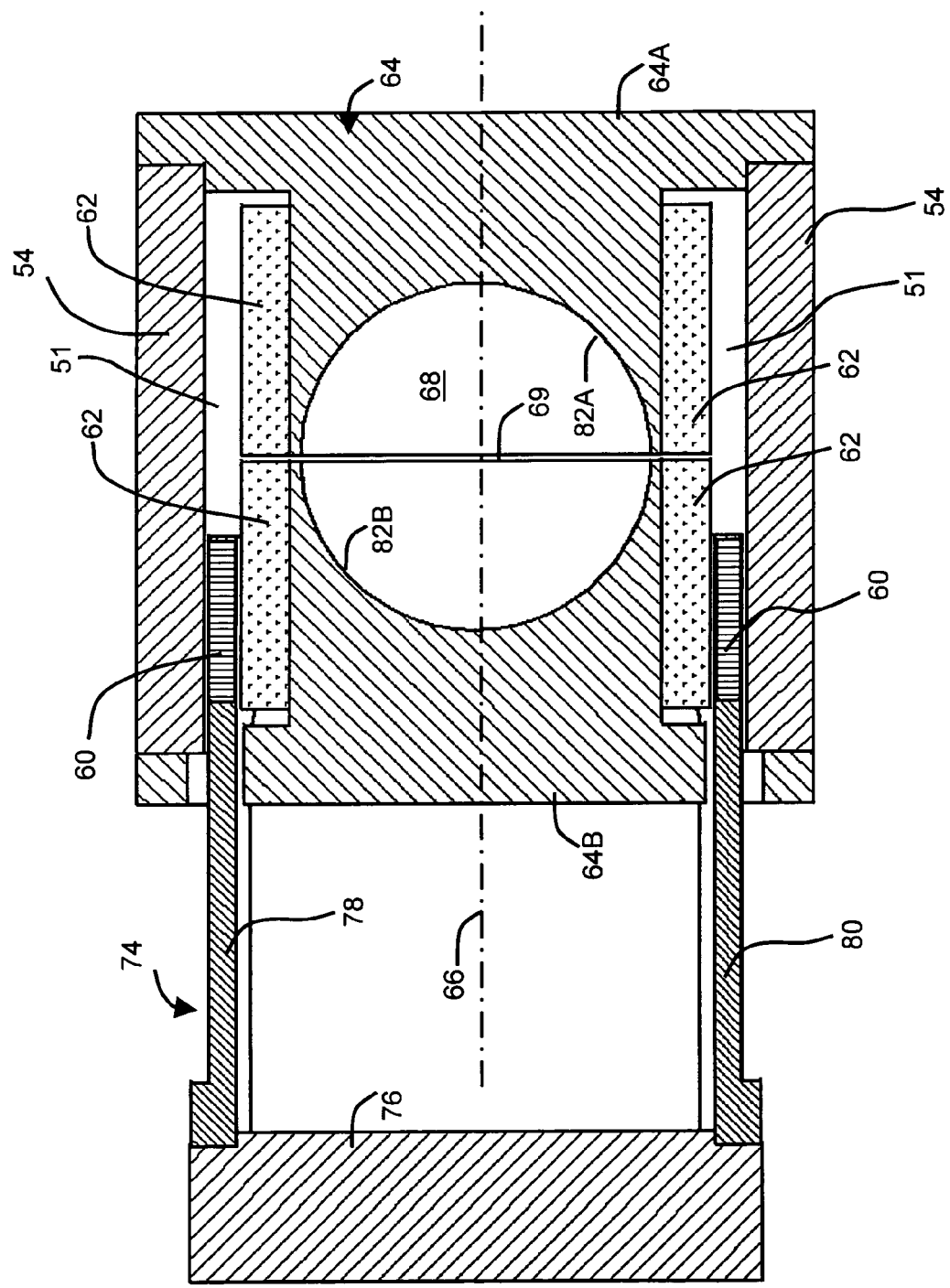
FIG. 5 is a simplified illustration of a cylindrical coil embodiment of the present invention in which magnets are positioned on the inside of the coil.

In one embodiment of the actuator of the present invention, a cylindrical coil 50 is surrounded by the magnets 52 attached to the housing 54, as illustrated in FIG. 4. In accordance with another embodiment, a cylindrical coil 60 surrounds the magnets 62 attached to the core 64 as can be seen in FIG. 5. In both cases, the entire coil is involved in producing the force, which improves utilization of the volume occupied by the actuator.

In the embodiments of FIGS. 4 and 5, the core 64, has two sections 64A and 64B. These sections are positioned along the longitudinal axis 66 of core 64. Each of the sections 64A and 64B has a flange at one end at a end face at the other end. Housing 54 is supported by these flanges.

In the embodiments of FIGS. 4 and 5, moving coil assembly 74 includes fingers 78 and 80 which extend through slots formed in the flange portion of section 64B. The portion of fingers 78 and 80 positioned inside the actuator within the gap 51 support the actuator coil 50 (60). The other ends of fingers 78 and 80 support a crossbar 76 external to the actuator.

It is to be understood that actuators in accordance with the present invention can take various cross sections, including circular, rectangular and square cross sections transverse to the longitudinal axis 66.

Figure 6:
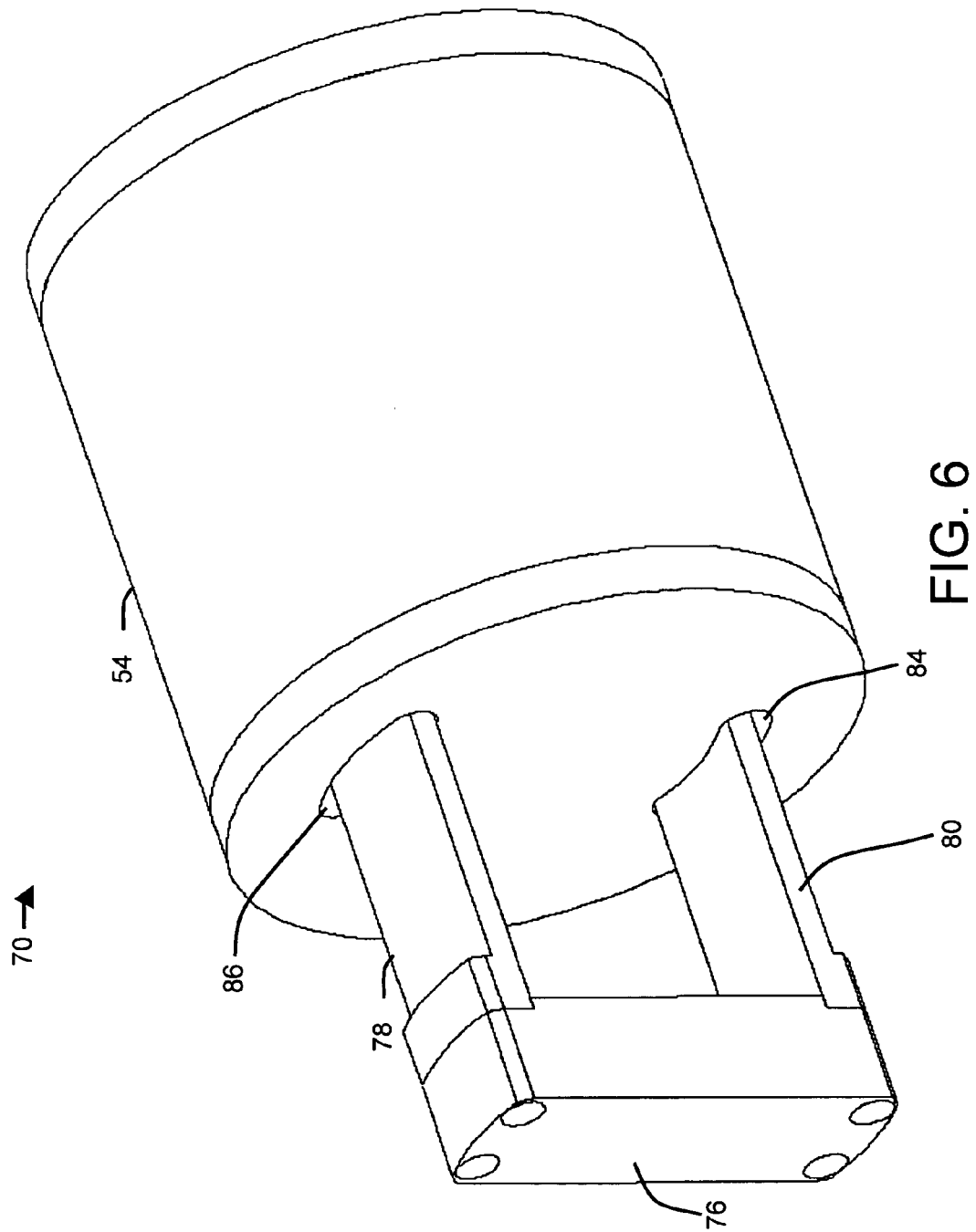
FIG. 6 illustrates an actuator with a cylindrical housing in accordance with the present invention.
Figure 7:
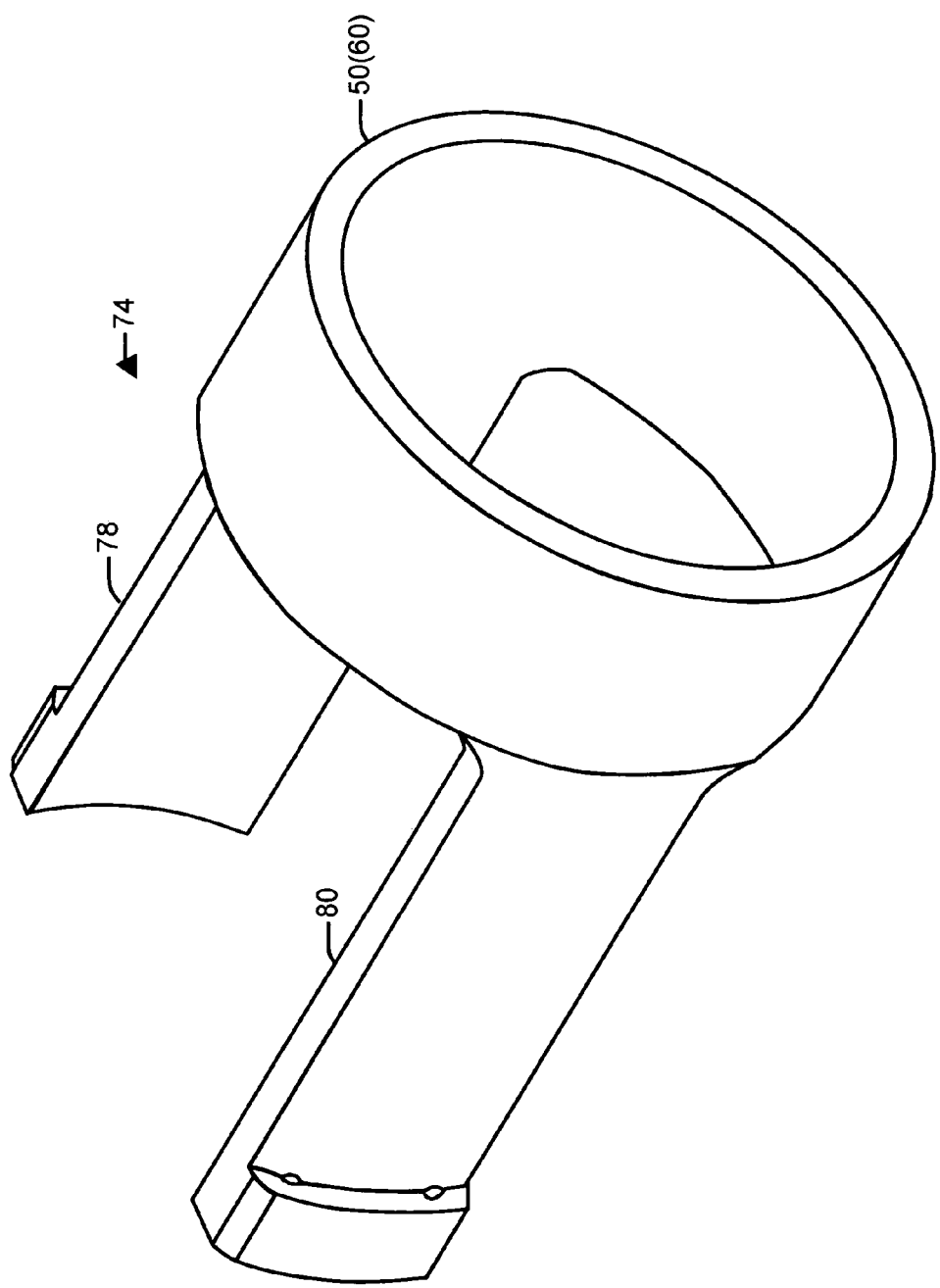
FIG. 7 illustrates an example of a moving coil assembly that can be employed in the actuator of FIG. 6.
Figure 8:
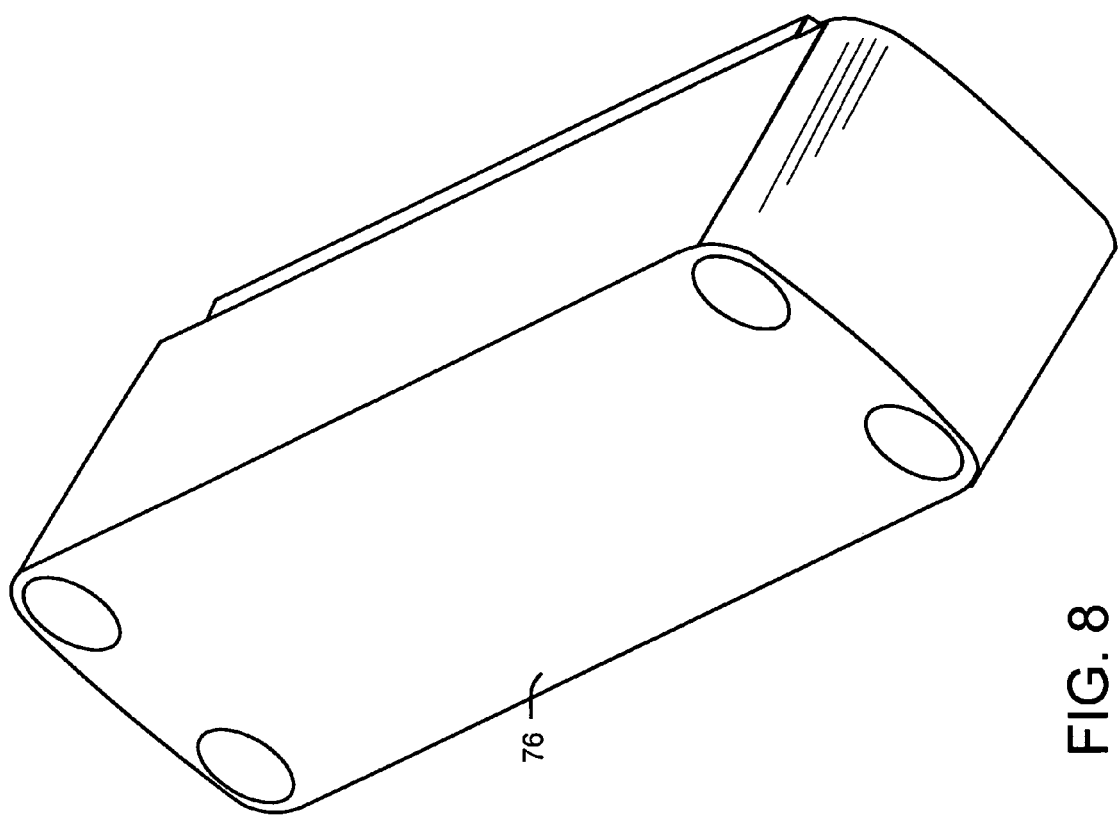
FIG. 8 illustrates a crossbar for connecting the two coil base "fingers" protruding through two slots in FIG. 6.

In accordance with the present invention, FIG. 6 depicts an actuator 70 with a cylindrical housing 72. A moving coil assembly 74, illustrated in FIG. 7, can be employed in the actuator 70 of FIG. 6. A crossbar 76, connecting two coil base "fingers" 78, 80 protruding through two slots 84, 86 of FIG. 6, is shown in FIG. 8.

In order to improve Force vs. Stroke characteristic of the actuators of the present invention, some magnetic material should be removed from the magnetic circuit. But unlike the method described in U.S. Pat. No. 5,677,963. where a hole is drilled through the core perpendicular to its axis, in accordance with the present invention the magnetic material removal is done along the axis 66 of the core 64 to form a cavity 68. The particular shape of the cavity 68 in the core 64 is determined by the desired Force vs. Stroke characteristic.

In order to accomplish the formation of the cavity in accordance with the present invention, a core preferably comprises two halves 64A, 64B, separated by a gap 69. The optimal size of this gap 69 is also calculated as part of the magnetic circuit. For example, FIG. 5 depicts a half-spherical cavity 82A (82B) in each half of the core 64A (64B). When assembly of the actuator is complete, the two cavities 82A, 82B form a substantially spherical cavity.

In the preferred embodiment of the present invention, the magnets can be radially magnetized ring magnets or a plurality of segmented magnets of the same polarity facing the coil and shaped to be positioned inside or outside of the coil. As can be seen from FIGS. 4 and 5, the magnets 52 (62) are spaced apart so that a space is formed between them that is aligned with gap 69. While the magnets 52 in FIG. 4 are shown to be spaced apart, the magnet structure can alternatively be formed without such spacing, such as by using a one-piece magnet.

Figure 9:
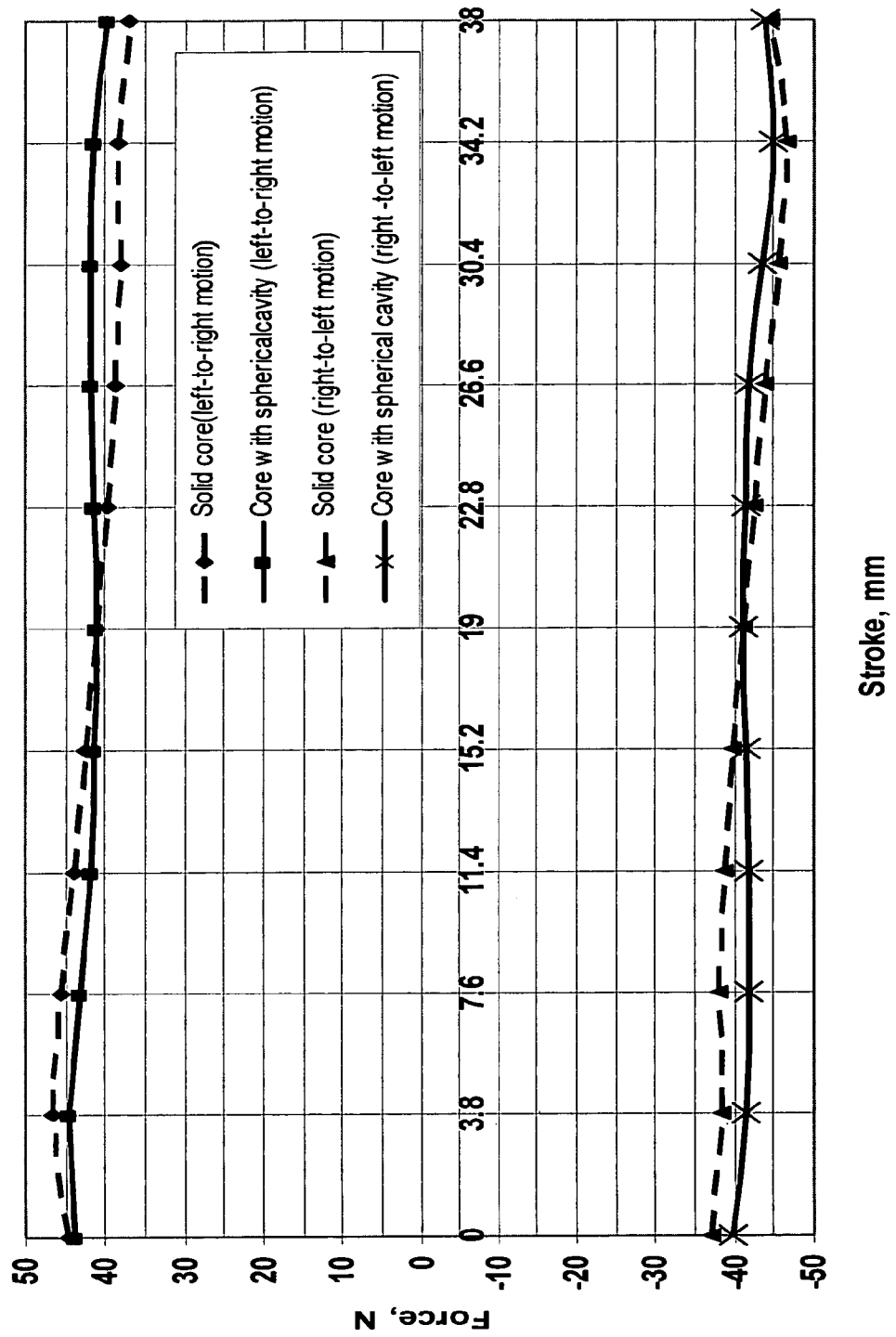
FIG. 9 illustrates that the Force vs. Stroke characteristic of an actuator with a cavity formed in accordance with the present invention can be almost constant throughout the stroke.

The advantage of having a cavity formed in the manner of the present invention is demonstrated by FIG. 9. FIG. 9 shows that the Force vs. Stroke characteristic of an actuator with such a cavity is almost constant throughout the stroke. In particular, the dashed lines illustrate the stroke of an actuator with a solid core. The dashed line with diamond shaped markers illustrates the Force vs. Stroke characteristic for a left-to-right motion, while the dashed line with the triangular markers illustrates the Force vs. Stroke characteristic for a right-to-left motion of the actuator. A variation of almost 10N can be seen in each of these plots.

In contrast, the solid lines illustrate the Force vs. Stroke characteristics of an actuator with a core having a spherical cavity in accordance with the present invention. The solid line with square markers illustrates the Force vs. Stroke characteristics for a left-to-right motion, while the solid line with "X" markers illustrates the right-to-left Force vs. Stroke characteristics. A variation of only approximately 5N is present, indicating that the force imbalance has been cut in half over the entire stroke in the illustrated example of an actuator in accordance with the present invention. Further, it can be seen that in the region extending from 11.4 mm to 26.6 mm of the stroke the force variation in either direction is less than approximately 1N.

Figure 10:
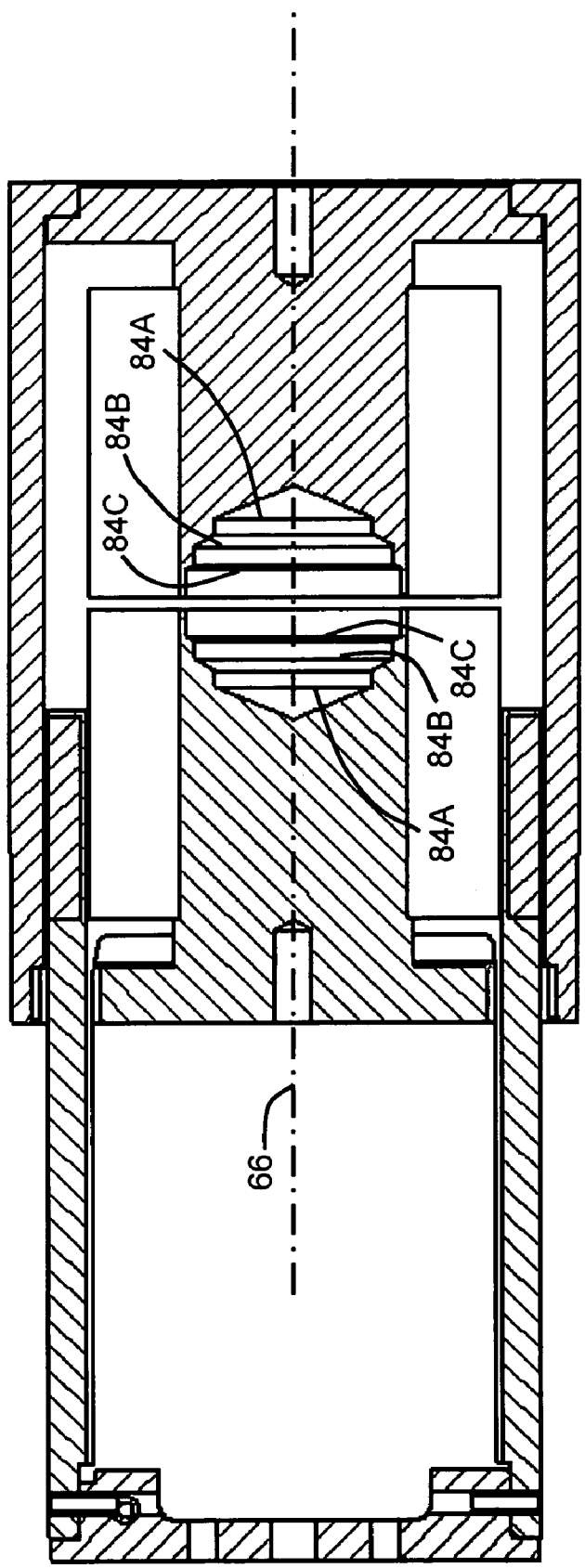
FIG. 10 illustrates one method of removing the portion of magnetic material to form the cavity in accordance with the present invention.

FIG. 10 depicts another method of removing the portion of magnetic material to form the desired cavity. In accordance with this method, holes (84A, 84B, 84C) of increasing diameter are drilled along the axis 66 of each half of the core. When the number of drills and their sizes are properly selected, the combined effect is very similar to that of a spherical cavity.

Preferably, the volume of the cavity should be optimized so that the armature reaction effect is minimized, the force characteristic is as flat as possible, and the force created by the actuator is not reduced. If the volume is smaller than optimal, the armature reaction effect will not be minimized, and the force characteristic will not be as flat as it could be. On the other hand, if the volume of the material removed from the core is greater than optimal, it would reduce the primary magnetic flux created by the permanent magnets and, consequently, reduce the force generated by the actuator.

Among the cavity shapes which can be employed in accordance with the present invention are half-spherical, hemispherical, curvilinear, stepped bore of increasing diameter towards the face, concentric circular regions of progressively increasing diameter, or a shape which is symmetrical about the longitudinal axis of the core and which decreases in span with distance along the longitudinal axis from the face of the core sections.

Figure 11:
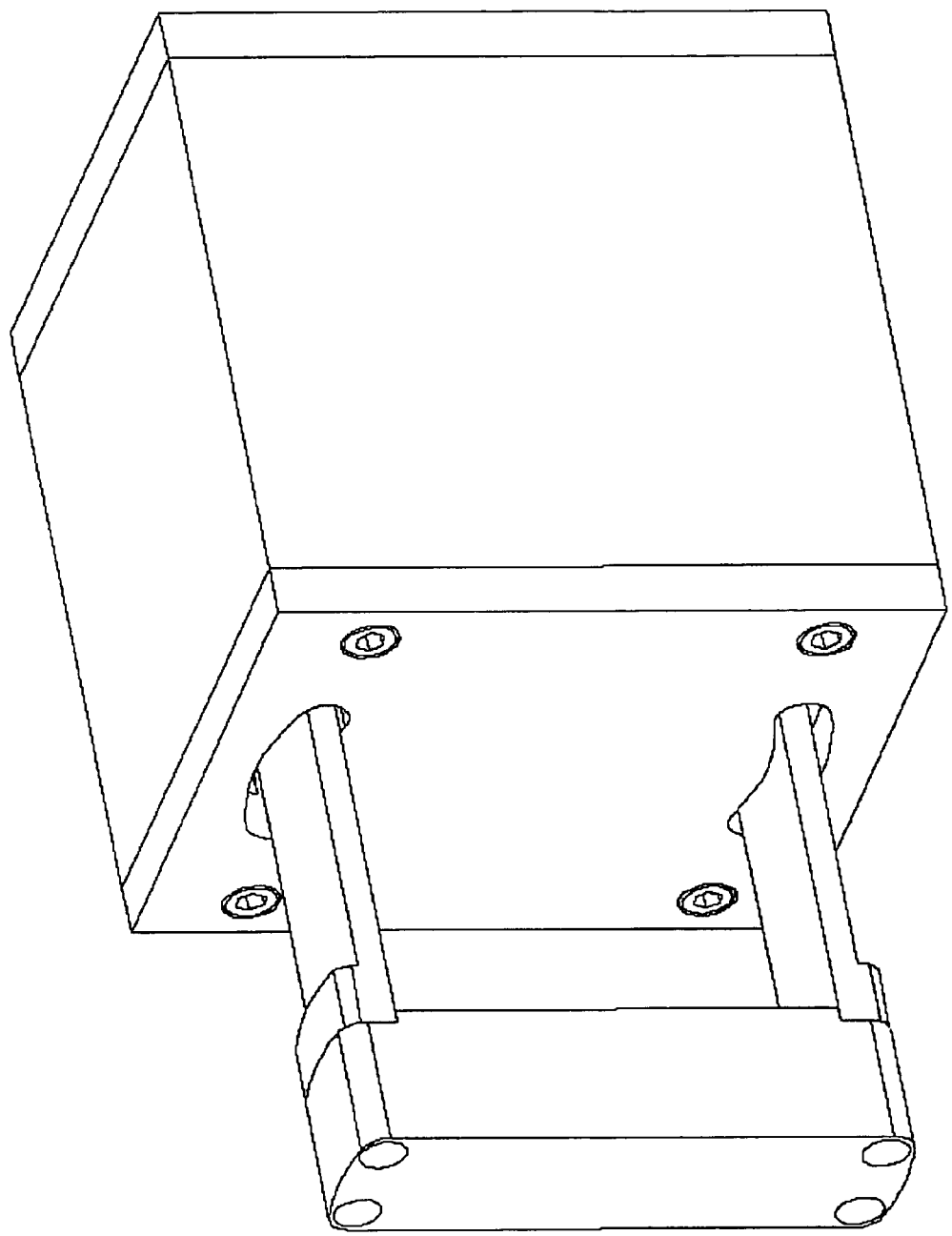
FIG. 11 illustrates an actuator with a housing having a square configuration in the direction perpendicular to its axis in accordance with the present invention.

It is to be understood that the housing and/or the core could also be of a rectangular, preferably square, configuration in the direction perpendicular to the plane of the figures. If a cross-section of the core is rectangular or square, the cavity in both halves of the core can be obtained by milling. An actuator with a housing having a square configuration in the direction perpendicular to its axis is presented in FIG. 11.

Figure 12B:
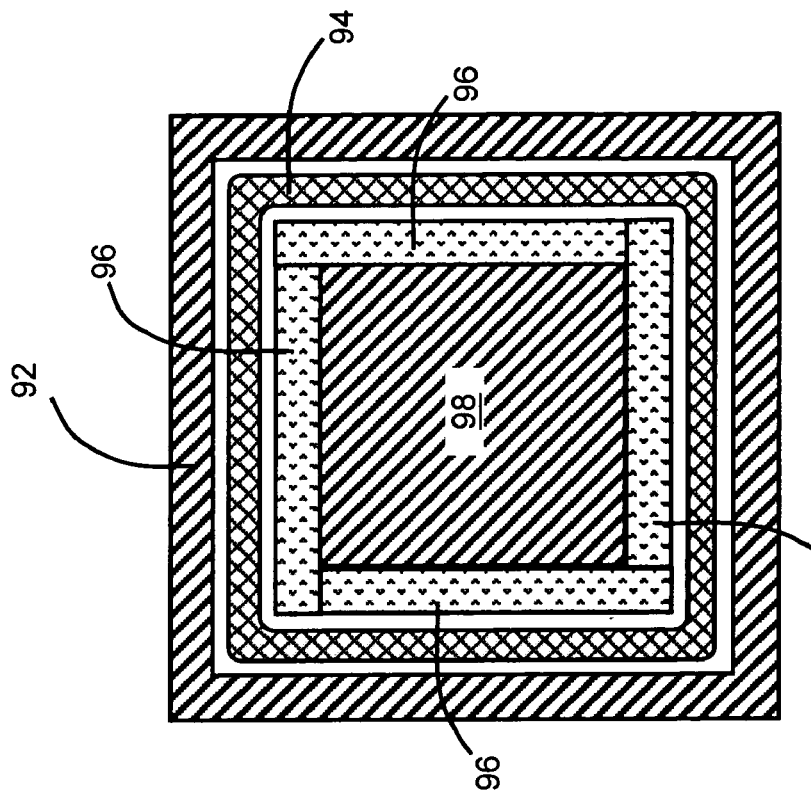
FIGS. 12A and 12B illustrate square cross-section linear actuator embodiments of the present invention in which the coil is positioned inside, and positioned outside the magnets, respectively.
Figure 12A:
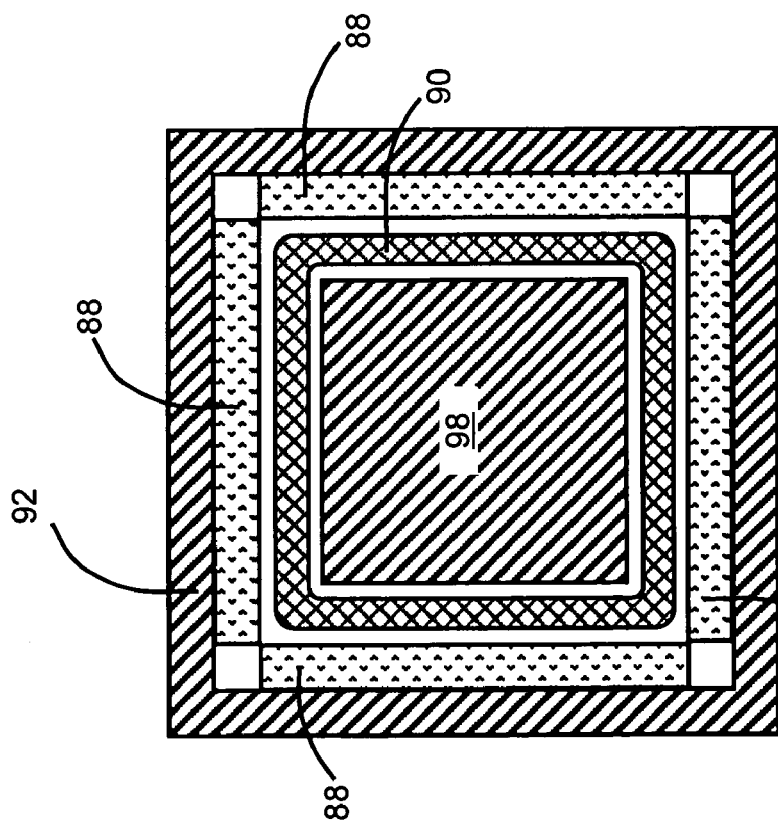

Two examples of square cross-section actuators in accordance with the present invention are represented in FIGS. 12A and 12B. FIG. 12A depicts configuration where the rectangular magnets 88 surround the coil 90 and are attached to the housing 92. FIG. 12B shows configuration where the coil 94 surrounds the rectangular magnets 96 attached to the core 98.

Disclosed is a linear actuator comprising a core, a coil assembly, a magnet assembly, and a housing. The core has a longitudinal axis and the coil assembly includes a coil that is shaped to be positioned about the core for movement along the longitudinal axis. The housing is supported by the core flanges and positioned about the coil assembly and the core. The magnet assembly comprises a radially magnetized ring magnet or a plurality of segmented magnets of the same polarity facing the coil and shaped to be positioned inside or outside of the coil, and supported by the housing or by the core. The core comprises first and second portions, each having an end face, wherein the first and second portions are positioned along the longitudinal axis so that the end faces oppose each other and are separated by a gap. A cavity is formed in each of the end faces along the longitudinal axis. The core, coil, housing and magnets of the above actuator of the present invention can be cylindrical in shape in a direction perpendicular to the longitudinal axis, and the cavity formed in each face of the first and second portions of the core can be half-spherical.

The cavities of the above embodiments, can be formed from concentric holes of varying diameters formed in the end faces of the first and second portions of the core with centers spaced along the longitudinal axis.

The core, coil, housing and magnets of the above actuator of the present invention can be rectangular, for example square, in shape in a direction perpendicular to the longitudinal axis, and the cavity formed in each face of the first and second portions of the core can be a plurality of the rectangular or square cavities of the increasing cross-section, similar to a plurality of cylindrical holes shown in FIG. 10.

The terms and expressions employed herein are terms of description and not of limitation, and there is no intent in the use of such terms and expressions of excluding equivalents of the features shown and described, or portions thereof, it being recognized that various modifications are possible within the scope of the invention claimed.

What is claimed is:

1. A linear actuator comprising
a core having a longitudinal axis;
a coil shaped for movement along the longitudinal axis of the core; and
a magnet structure positioned along the longitudinal axis of the core;
wherein the core includes first and second portions, each including an end face and each defining a cavity having an axis of symmetry along the longitudinal axis of the core and extending into the core from the end face, and further wherein the first and second portions are positioned so that the end faces are adjacent, oppose each other, and are separated by a gap.

2. The linear actuator of claim 1, further including a housing supported by core flanges and positioned about the coil and the core.

3. The linear actuator of claim 2, wherein the core, coil, housing and magnets are cylindrical in shape in a direction perpendicular to the longitudinal axis, and the cavity defined by each of the first and second portions of the core is half-spherical.

4. The linear actuator of claim 1, wherein the magnet assembly includes magnets of the same polarity facing the coil.

5. The linear actuator of claim 4, wherein the magnets are shaped to be positioned outside of the coil.

6. The linear actuator of claim 5, further including a housing supported by core flanges and positioned about the coil and the core, and wherein the magnets are supported by the housing.

7. The linear actuator of claim 3, wherein the gap is in a plane transverse to the longitudinal axis, and the magnets are positioned to form a space between them which is aligned with the plane transverse to the longitudinal axis.

8. The linear actuator of claim 1, wherein the cavity defined by the first portion of the core has a hemispherical shape.

9. The linear actuator of claim 8, wherein the cavity defined by the second portion of the core has a hemispherical shape.

10. The linear actuator of claim 1, wherein the cavity defined by the second portion of the core has a curvilinear cross section along the longitudinal axis.

11. The linear actuator of claim 10, wherein the cavity defined by the first portion of the core has a curvilinear cross section along the longitudinal axis.

12. The linear actuator of claim 1, wherein the cavity defined by the first portion of the core has a cross section along the longitudinal axis which is widest at the end face of the first portion of the core.

13. The linear actuator of claim 12, wherein the cavity defined by the second portion of the core has a cross section along the longitudinal axis which is widest at the end face of the second portion of the core.

14. The linear actuator of claim 1, wherein the cavity defined by each of the first and second portions of the core has a cross section along the longitudinal axis which is widest at each end face of the first and second portions, respectively, of the core.

15. The linear actuator of claim 14, wherein the cavity defined by each of the first and second portions of the core has a hemispherical cross section along the longitudinal axis.

16. The linear actuator of claim 14, wherein the cavity defined by each of the first and second portions of the core has a curvilinear cross section along the longitudinal axis.

17. The linear actuator of claim 14, wherein the cavity defined by each of the first and second portions of the core has a cross section along the longitudinal axis which is widest toward each end face, and which progressively narrows along the longitudinal axis away from each end face.

18. The linear actuator of claim 14, wherein each of the first and second portions of the core define the respective cavity by circular regions that are coaxial with the longitudinal axis and have diameters that decrease in a direction away from the end face.

19. The linear actuator of claim 1 wherein the gap is devoid of components.

20. A linear actuator comprising
a core;
a coil shaped to be positioned about the core for movement along a longitudinal axis of the core;
a magnet assembly including magnets of the same polarity facing the coil; and
a housing supported by core flanges and positioned about the coil and the core; and
wherein the core includes first and second portions, each having an end face, and the first and second portions are positioned along the longitudinal axis so that the end faces are adjacent, oppose each other, and are separated by a gap and further wherein a cavity is symmetrically defined in each of the first and second portions extending from the end faces along the longitudinal axis.

21. The linear actuator of claim 20, wherein the magnets are shaped to be positioned outside of the coil, and to be supported by the housing.

22. The linear actuator of claim 20, wherein the cavity defined by each of the first and second portions of the core has a half-spherical cross section relative to the longitudinal axis.

* * * * *